United States Patent
Wu et al.

(10) Patent No.: US 12,050,660 B2
(45) Date of Patent: Jul. 30, 2024

(54) END-TO-END SYSTEM TRAINING USING FUSED IMAGES

(71) Applicant: Motional AD LLC, Boston, MA (US)

(72) Inventors: Yitian Wu, Los Angeles, CA (US); Sourabh Vora, Marina del Ray, CA (US); Alex Lang, Culver City, CA (US); Oscar Beijbom, Santa Monica, CA (US)

(73) Assignee: Motional AD LLC, Boston, MA (US)

( * ) Notice: Subject to any disclaimer, the term of this patent is extended or adjusted under 35 U.S.C. 154(b) by 128 days.

(21) Appl. No.: 17/444,956

(22) Filed: Aug. 12, 2021

(65) Prior Publication Data

US 2022/0358328 A1 Nov. 10, 2022

Related U.S. Application Data

(60) Provisional application No. 63/184,690, filed on May 5, 2021.

(51) Int. Cl.

| | |
|---|---|
| *G06F 18/213* | (2023.01) |
| *G06F 18/241* | (2023.01) |
| *G06F 18/2431* | (2023.01) |
| *G06F 18/25* | (2023.01) |
| *G06N 3/02* | (2006.01) |
| *G06T 7/73* | (2017.01) |
| *G06V 10/75* | (2022.01) |

(52) U.S. Cl.
CPC .......... *G06F 18/213* (2023.01); *G06F 18/241* (2023.01); *G06F 18/2431* (2023.01); *G06F 18/25* (2023.01); *G06N 3/02* (2013.01); *G06T 7/75* (2017.01); *G06V 10/751* (2022.01)

(58) Field of Classification Search
CPC .. G06F 18/213; G06F 18/241; G06F 18/2431; G06F 18/25; G06N 3/02; G06N 3/045; G06N 3/08; G06T 7/75; G06T 2207/10028; G06T 2207/20081; G06T 2207/20084; G06T 2207/30261; G06T 7/73; G06T 5/50; G06T 7/11; G06T 2207/20221; G06V 10/751; G06V 10/774; G06V 10/803; G06V 10/82; G06V 20/58; G06V 20/64; G06V 10/454; G06V 20/56; G06V 10/44; G01S 17/894; G01S 17/89

See application file for complete search history.

(56) References Cited

U.S. PATENT DOCUMENTS

| | | | |
|---|---|---|---|
| 10,311,335 B1 * | 6/2019 | Kim | .... G05D 1/0088 |
| 10,408,939 B1 | 9/2019 | Kim et al. | |

(Continued)

OTHER PUBLICATIONS

Vora et al., PointPainting: Sequential Fusion for 3D Object Detection, May 6, 2020, 11 pages.

(Continued)

*Primary Examiner* — Jianxun Yang
(74) *Attorney, Agent, or Firm* — Knobbe, Martens, Olson & Bear, LLP

(57) ABSTRACT

Provided are methods for end-to-end perception system training using fused images, which can include fusing different types of images to form a fused image, extracting features from the fused image, calculating a loss, and modifying at least one network parameter of an image semantic network based on the loss. Systems and computer program products are also provided.

20 Claims, 11 Drawing Sheets

Training System 500

(56) References Cited

U.S. PATENT DOCUMENTS

| | | |
|---|---|---|
| 10,776,673 B2 | 9/2020 | Kim et al. |
| 2020/0025935 A1* | 1/2020 | Liang .................. G06V 10/764 |
| 2021/0063578 A1 | 3/2021 | Wekel et al. |
| 2021/0146952 A1 | 5/2021 | Vora et al. |
| 2021/0181745 A1 | 6/2021 | Liu et al. |
| 2022/0261590 A1* | 8/2022 | Brahma .................. G01S 17/89 |

OTHER PUBLICATIONS

Lang et al., PointPillars: Fast Encoders for Object Detection from Point Clouds, May 7, 2020, 9 pages.

Cui et al., Deep Learning for Image and Point Cloud Fusion in Autonomous Driving: A Review, Journal of Latex Class Files, Sep. 9, 2020, 19 pages.

Great Britain Office Action issued for Application No. GB 2113834.2, dated Jun. 27, 2023.

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

Wang, Z. et al., "Fusing Bird's Eye View LIDAR Point Cloud and Front View Camera Image for 3D Object Detection", 2018 IEEE Intelligent Vehicles Symposium (IV), Jun. 26-30, 2018, pp. 834-839.

Great Britain Office Action issued for Application No. GB 2113834.2, dated Feb. 25, 2022.

Korean Office Action issued for Application No. KR 10-2021-0180723, dated Mar. 13, 2023.

Korean Notice of Allowance issued for Application No. KR 10-2021-0180723, dated Jan. 10, 2024.

Korean Office Action issued for Application No. KR 10-2021-0180723, dated Sep. 25, 2023.

* cited by examiner

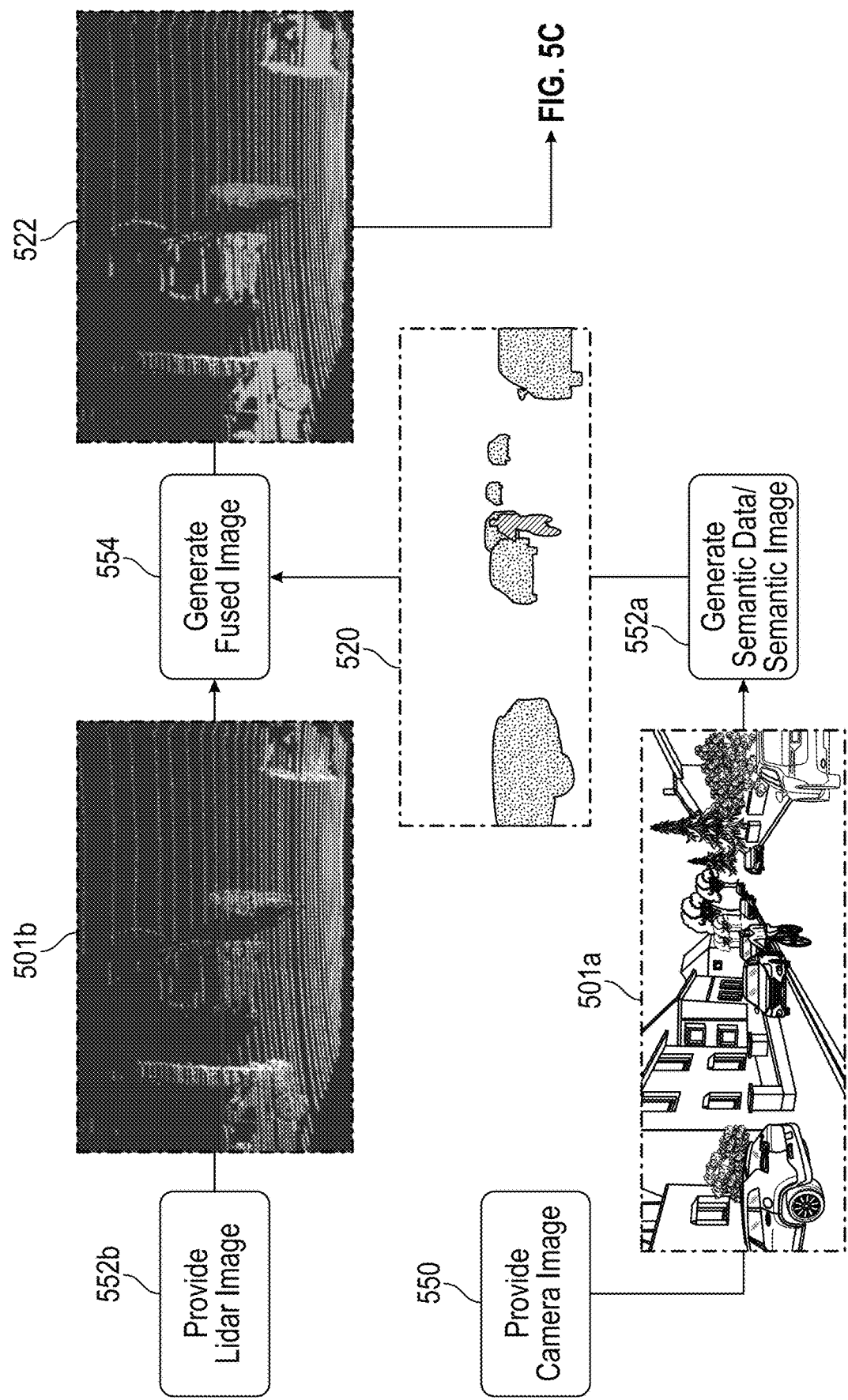

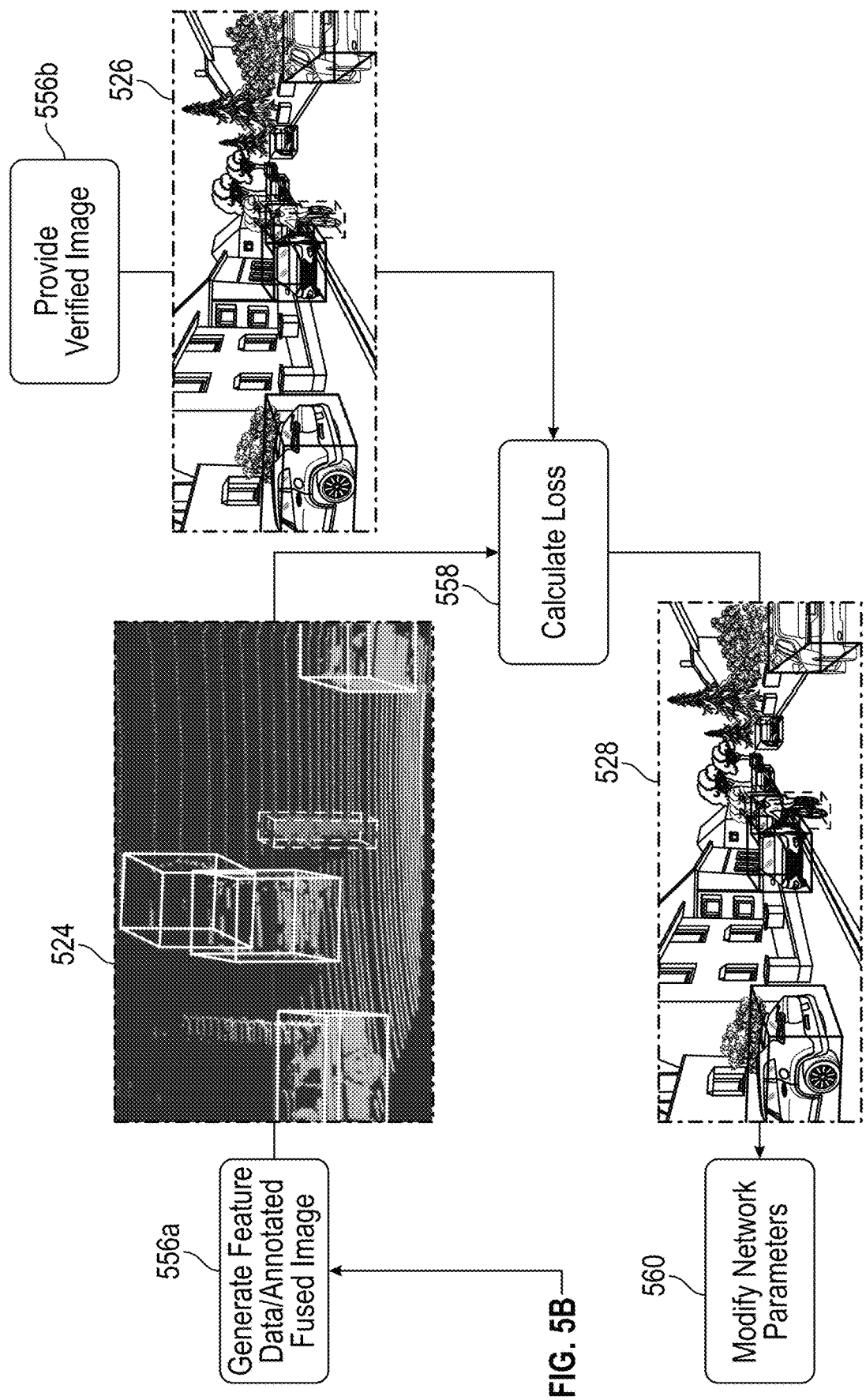

END-TO-END SYSTEM TRAINING USING FUSED IMAGES

BACKGROUND

Self-driving vehicles typically use multiple types of images to perceive the area around them. Training these systems to accurately perceive an area can be difficult and complicated.

BRIEF DESCRIPTION OF THE FIGURES

FIGS. 5B and 5C are operation diagrams illustrating an example end-to-end training operation of the perception system.

DETAILED DESCRIPTION

Figure 1:
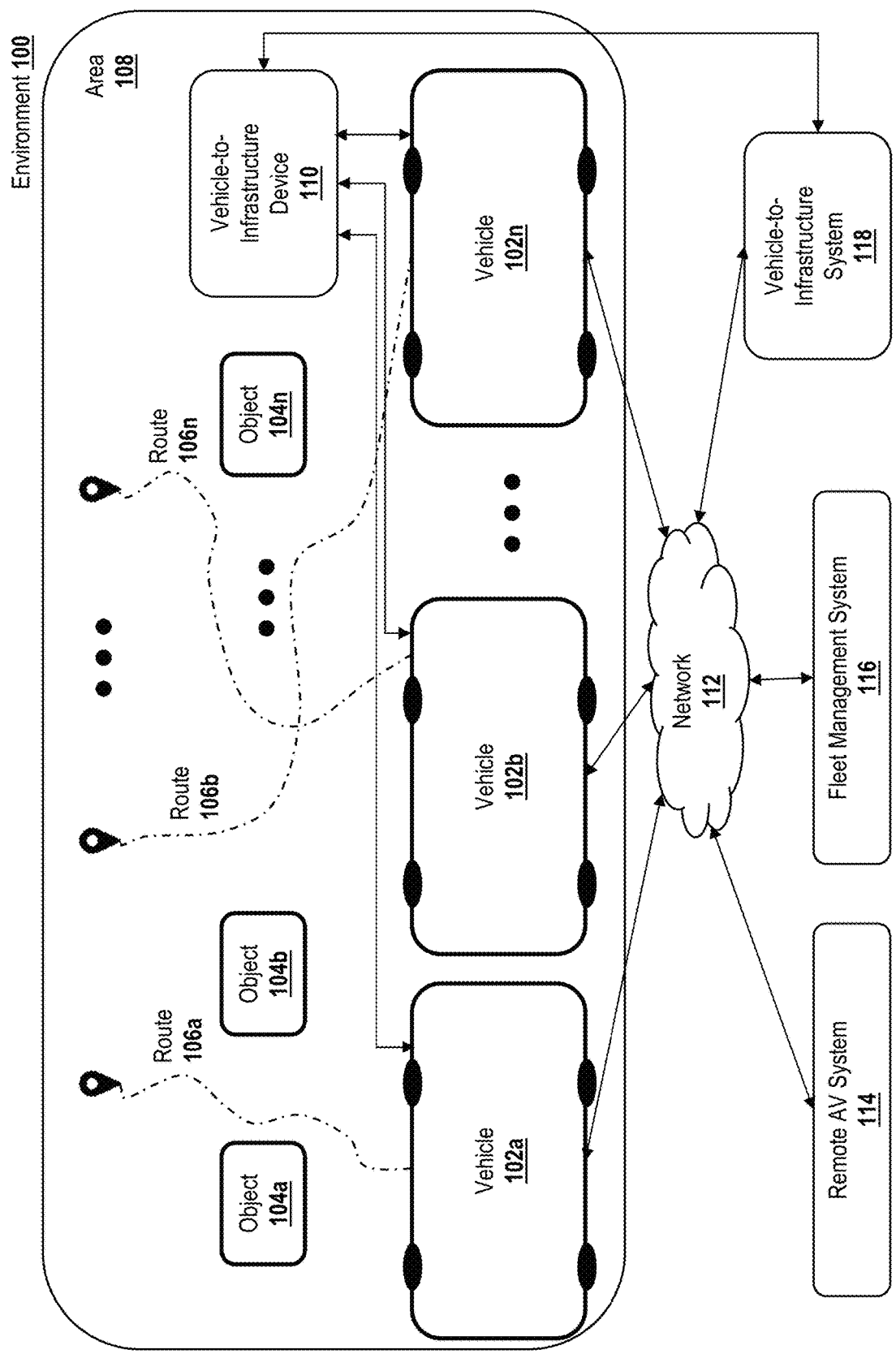
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. Also, the term "or" is used in its inclusive sense (and not in its exclusive sense) so that when used, for example, to connect a list of elements, the term "or" means one, some, or all of the elements in the list. Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement a testing system that performs trains a perception system end-to-end to identify objects. As a non-limiting example, the testing system can train the perception system by fusing a lidar image with a semantic image (generated by an image semantic network from a camera image), extracting features from the fused image, and modifying at least one network parameter in the image semantic network based on a calculated loss between a ground truth image and the features extracted from the fused image.

By virtue of the implementation of systems, methods, and computer program products described herein, an autonomous vehicle can more accurately identify objects within an image, more accurately identify the location of identified objects within the image, more accurately predict trajectories of identified objects within the image, determine additional features for identified objects, and infer additional information about the scene of an image.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g., a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high-level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high-level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
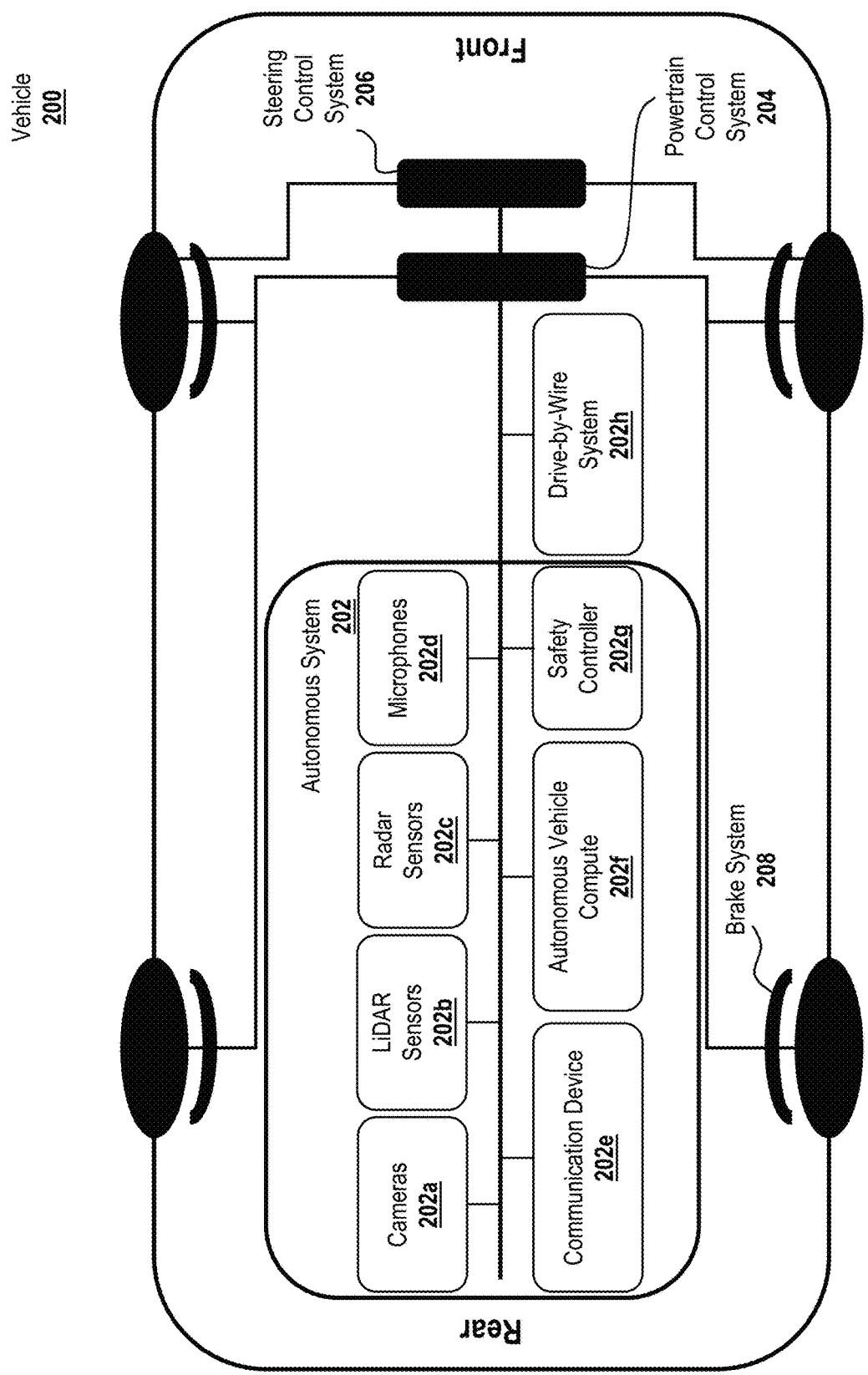
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
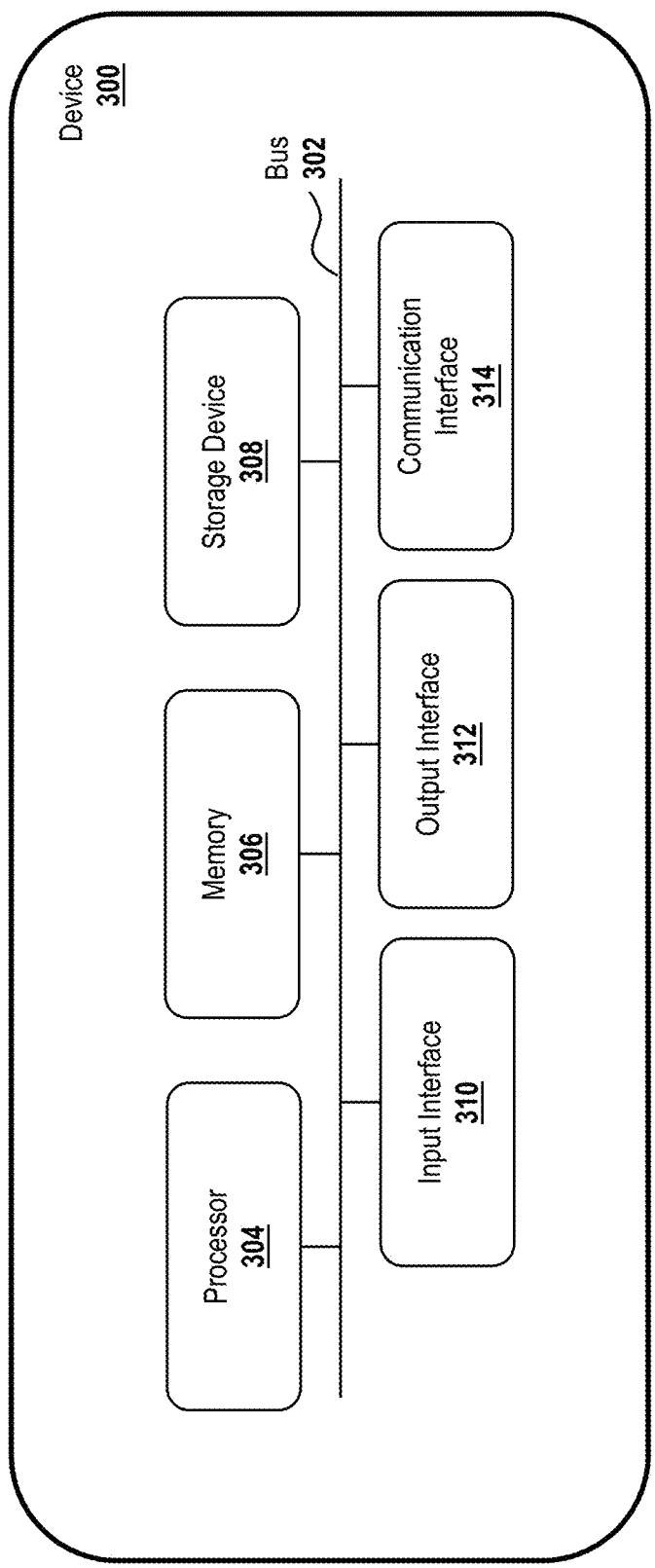
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid-state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally, or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally, or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally, or alternatively, a set of components (e.g., one or more components) of device 300 can perform one or more functions described as being performed by another component or another set of components of device 300.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4A:
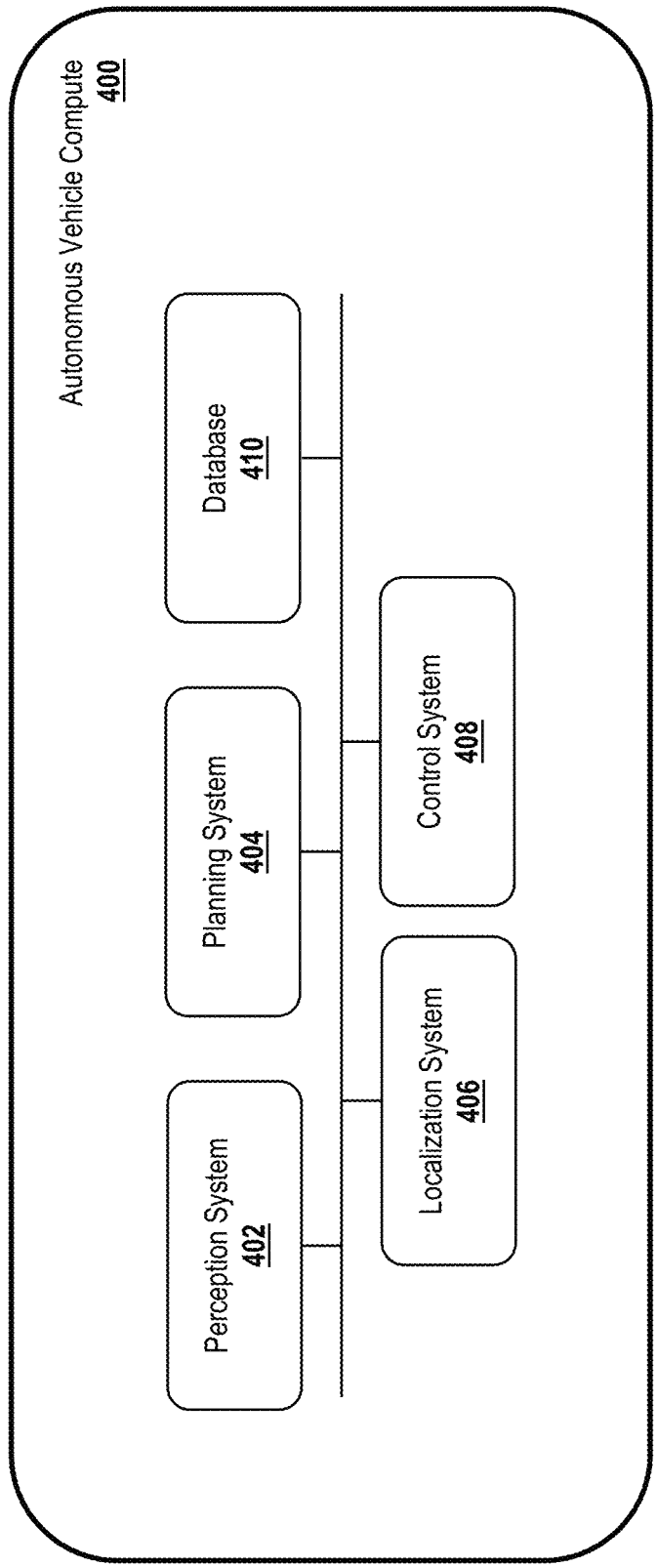
FIG. 4A is a diagram of certain components of an autonomous system.
Figure 4B:
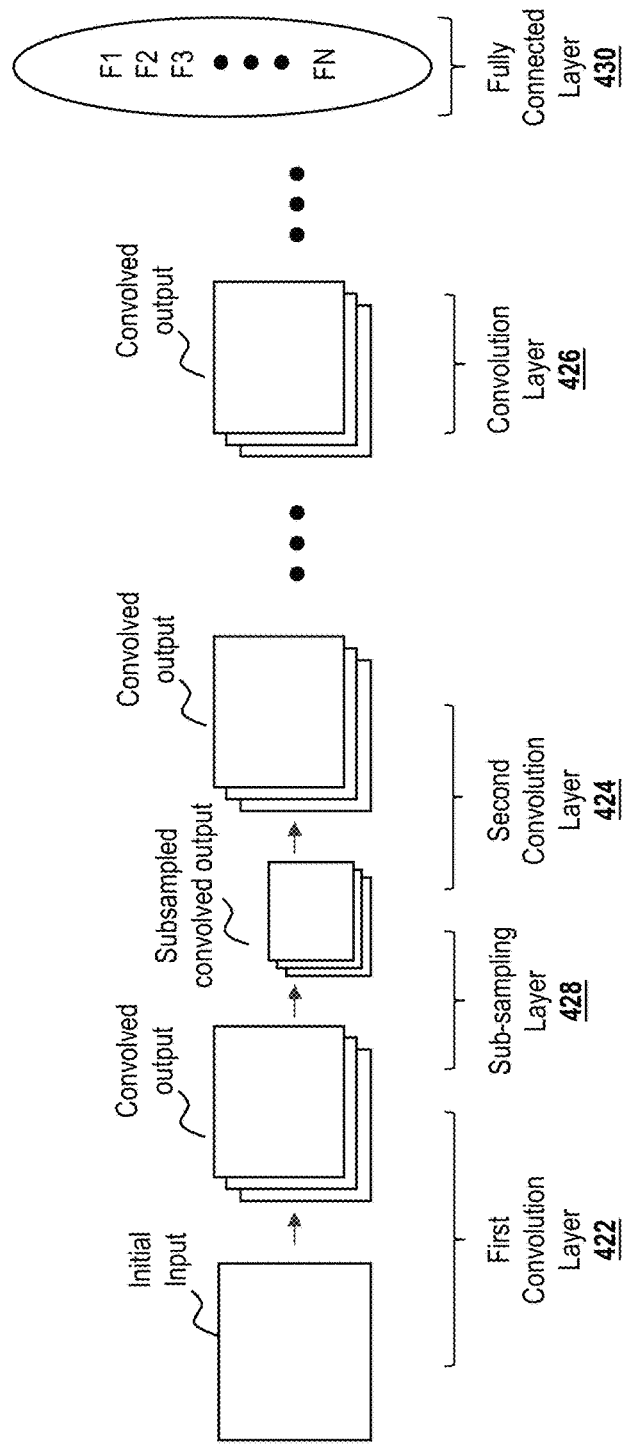
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 430 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
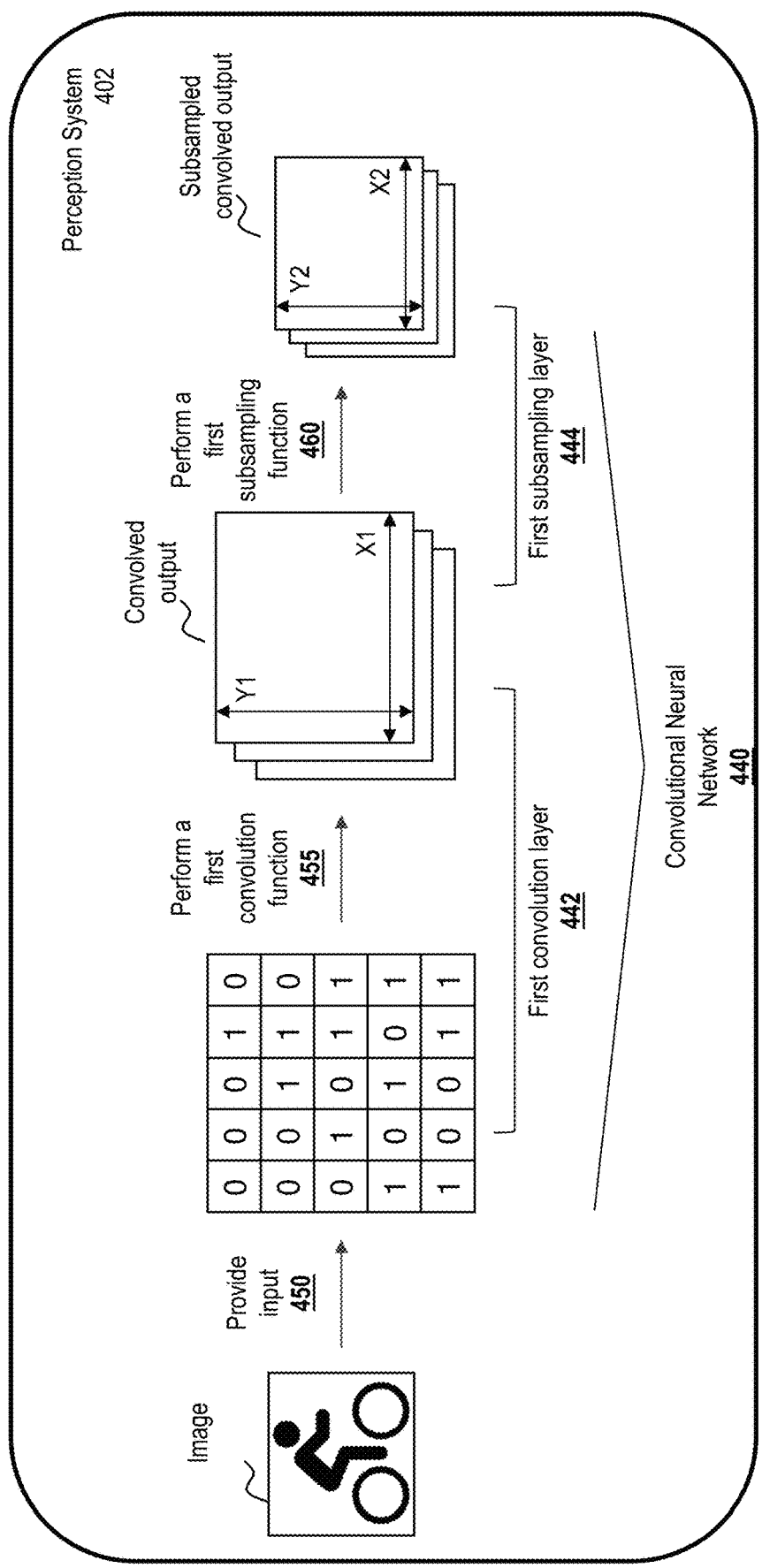
FIGS. 4C and 4D are a diagram illustrating example operation of a CNN.
Figure 4D:
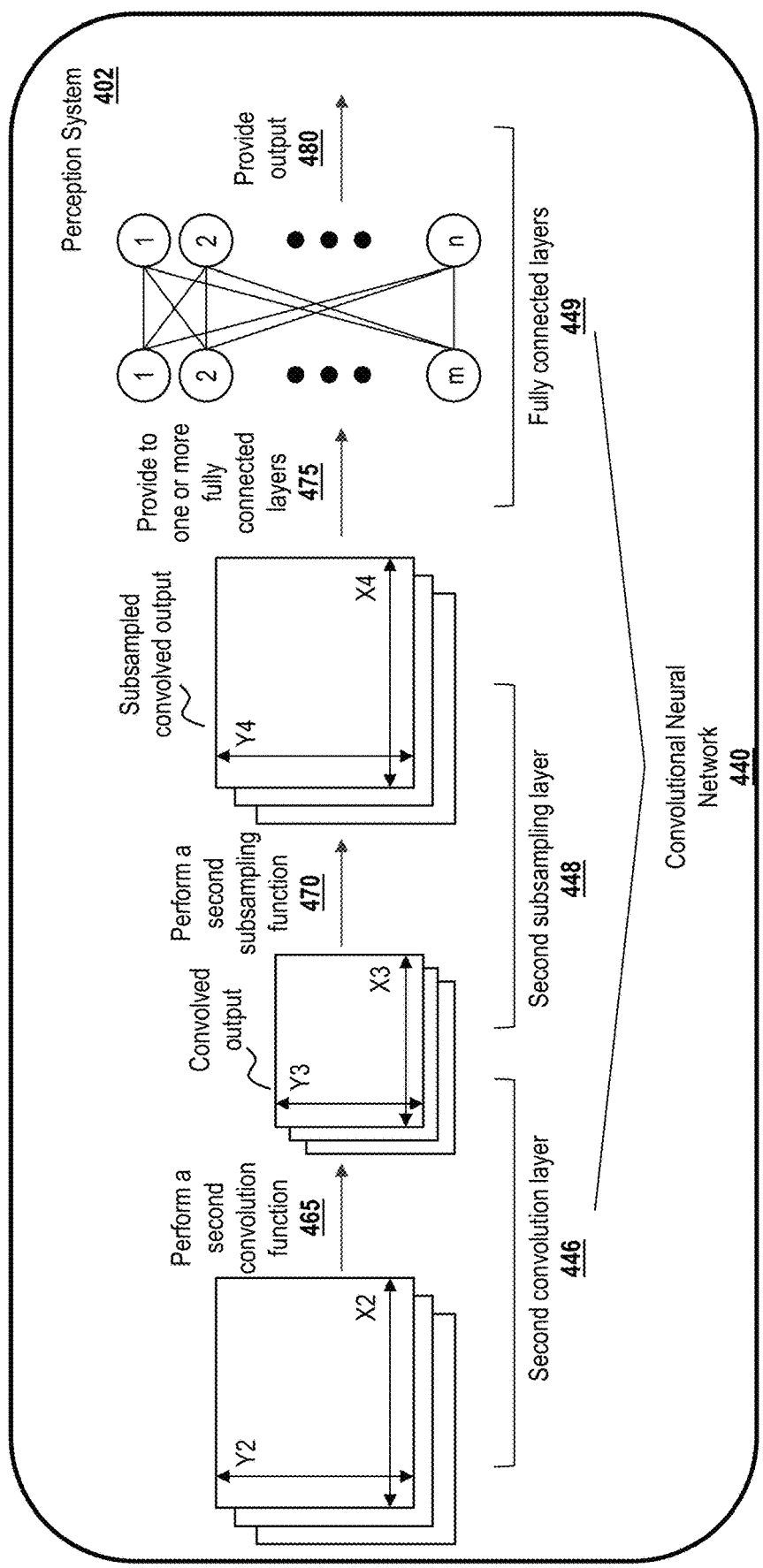

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Training System

Figure 5A:
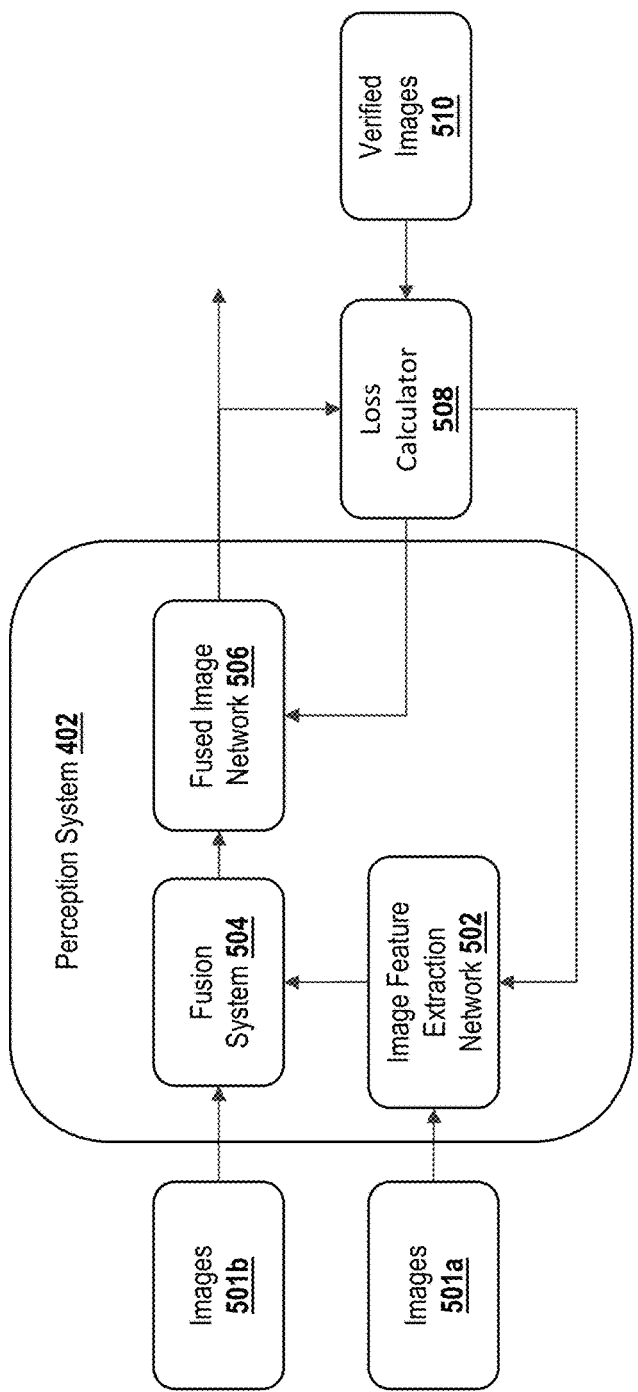
FIG. 5A is a block diagram illustrating an example of an end-to-end training environment for a perception system.

FIG. 5A is a block diagram illustrating an example of an end-to-end training system 500 for a perception system 402.

The training system 500 can be used to train the perception system 402 end-to-end to extract semantic features using fused images. The fused images can result from the combination of different types of images, such as a camera image and a lidar image. The extracted semantic features can include, but are not limited to, width, height, and length of an object in an image, object classification or class label, bounding boxes for an object, object movement, object orientation, object trajectory prediction, object attributes (e.g., traffic light status (e.g., red, green, yellow, blinking, etc.) or car with right/left turn signal blinking or hazard lights blinking, etc.), etc.

By training the perception system end-to-end to extract semantic features using fused images, the training system 500 can improve the perceptions system's 402 ability to accurately detect objects within an image, accurately detect location of objects within an image, predict future trajectories of each objects (e.g., determine whether a car has a right turn signal on, which will enable the system to predict that the car is going to make a right turn, which can make the trajectory prediction task easier), as well as provide more useful semantic data to the fused image network, and perform multi-task functions (e.g., concurrently or simultaneously output image based semantic segmentation task, lidar based semantic segmentation task, 3d object detection task, and/or 3d object prediction). The improved perception system 402 can, in turn, improve the safety, accuracy, and reliability of the autonomous vehicle compute 400 and the autonomous system 202.

In the illustrated example of FIG. 5A, the training system 500 includes different types of images 501a, 501b (individually or collectively referred to as images 501), the perception system 402, a loss calculator 508, and verified images 510. There can be additional elements, fewer elements, different elements, and/or differently arranged elements, than those illustrated in FIG. 5A. Additionally, or alternatively, at least one element of the training system 500 can perform one or more functions described as being performed by at least one different element of FIG. 5A. For example, the functions of the loss calculator 508 can be performed by the fused image network 506 and/or the loss calculator 508 can form part of the perception system 402. Additionally, or alternatively, at least one set of elements of the training system 500 can perform one or more functions described as being performed by at least one different set of elements of the training system 500.

The images 501 and verified images 510 can include different types of images corresponding to the sensor or device used to generate them. For example, the images 501a may be camera images generated from one or more cameras, such as cameras 202a. The images 501b, for example, may be lidar images generated from one or more lidar sensors, such as lidar sensors 202b. Other image types can be used, such as radar images generated from one or more radar sensors (e.g., generated from radar sensors 202c).

The images 501 and verified images 510 can be stored in one or more data stores as one or more datasets. For example, images 501a can be stored in one data store as one or more datasets and the images 501b can be stored in a different data stores as one or more datasets. As another example, the images 501 can be stored in the same data store as different datasets. Accordingly, images 501 of the same type can be stored together as one or more datasets, and images of different types can be stored in different data stores and/or as different datasets of the same data store, etc. The datasets of images 501 and verified images 510 may be open-source datasets, and/or proprietary datasets.

In some cases, the datasets of images 501 and verified images 510 can be different sizes or have a different number of images. For example, a camera images dataset may be larger and/or have more images than a lidar images dataset and/or a radar images dataset, or vice versa.

For some or all images of a dataset, the dataset may include an unannotated or clean version of an image (e.g., image 501), and a corresponding annotated version of the same image (e.g., image 510). The annotated image 510 may also be referred to herein as a trusted image and/or verified image 510. In certain cases, for each image of a dataset, the dataset may include the image (e.g., image 501) and annotations for that image. In some such cases, the annotations alone or in combination with the image can be referred to as the verified image 510.

The verified images 510 can include features annotated by a user, such as, but not limited to, width, height, and length of an object in an image, object classification or class label (e.g., vehicle, pedestrian, bicycle, barrier, traffic cone, drivable surface, or a background, etc.), bounding boxes for an object, object movement (e.g., velocity, etc.), object orientation, object attributes (e.g., traffic light status (e.g., red, green, yellow, blinking, etc.) or car with right/left turn signal blinking or hazard lights blinking, etc.), object trajectory prediction, etc. The verified images 510 may be annotated by a person and used for loss calculations to train the perception system 402. In certain cases, the verified images 510 may also be referred to as ground truth images and the image data of a verified image as ground truth image data.

In the illustrated example of FIG. 5A, the perception system 402 includes an image feature extraction network 502, fusion system 504, and fused image network 506. There can be additional elements, fewer elements, different elements, and/or differently arranged elements, than those illustrated in FIG. 5A. Additionally, or alternatively, at least one element of the perception system 402 can perform one or more functions described as being performed by at least one different element of FIG. 5A. Additionally, or alternatively, at least one set of the perception system 402 can perform one or more functions described as being performed by at least one different set of elements of the perception system 402.

Image Feature Extraction Network

The image feature extraction network 502 can be implemented using one or more CNNs that are the same as, or similar to, CNNs 420 and can be configured to receive image data associated with the images 501 as input and output a semantic image and/or semantic data associated with the semantic image.

In certain cases, the image feature extraction network 502 can be implemented using the DeepLabv3+ or PSP+ neural network models. However, it will be understood that a variety of neural networks can be used to extract features from an image. In some cases, the images 501 can be camera images, however, it will be understood that various types of images can be used as an input for the image feature extraction network 502.

As described herein, at least with reference to CNN 420, the image feature extraction network 502 can include one or more filters, convolution layers, subsampling layers, and/or fully connected layers that can be used to identify and classify different objects in an image 501 (e.g., vehicle, pedestrian, bicycle, barrier, traffic cone, drivable surface, or a background, etc.). Accordingly, in certain cases, the semantic data output by the image feature extraction network 502 can identify one or more objects in the image 501 and the object classification for the respective objects.

The semantic image can include rows of pixels. Some or all pixels in the semantic image can include semantic data, such as one or more feature embeddings. In certain cases, the feature embeddings can relate to one or more object attributes, such as but not limited to an object classification or class label identifying an object's classification (sometimes referred to as an object's class) (non-limiting examples: vehicle, pedestrian, bicycle, barrier, traffic cone, drivable surface, or a background, etc.). The object classification may also be referred to as pixel class probabilities or semantic segmentation scores. In some cases, the object classification for the pixels of an image 501 can serve as compact summarized features of the image 501. For example, the object classifications can include a probability value that indicates the probability that the identified object classification for a pixel is correctly predicted.

In some cases, the feature embeddings can include one or more n-dimensional feature vectors. In some such cases, an individual feature vector may not correspond to an object attribute, but a combination of multiple n-dimensional feature vectors can contain information about an object's attributes, such as, but not limited to, its classification, width, length, height, etc. In certain cases, the feature embeddings can include one or more floating point numbers, which can assist a downstream model in its task of detection/segmentation/prediction.

Fusion System

The fusion system 504 can be implemented using one or more processors and can be configured to fuse different types of images together to form a fused image. For example, the fusion system 504 can fuse lidar and camera, radar and camera, lidar and radar, and/or lidar, radar, and camera images to form a fused image. In certain cases, such as where the fusion system 504 fuses lidar, radar, and a camera image, the fused image could include a 3D scene where each point in the 3D scene includes lidar data, radar data, and a projected pixel value.

In some cases, in fusing the images, the fusion system 504 can transform images from one coordinate frame type (e.g., lidar coordinate frame) to another coordinate frame type (e.g., camera coordinate frame or bird's eye view). For example, the fusion system can transform a lidar image (e.g., 3D point cloud) into a bird's eye view image and can fuse the pixels of the bird's eye view image with the pixels from the semantic image.

In certain cases, each pixel from an image of one type can be mapped to or fused with a pixel from another image of a different type. The resulting pixel may also be referred to herein as a fused pixel. In certain cases, the fusion system 504 fuses corresponding pixels (e.g., pixels at the same x, y position of the respective images) from the images.

In some cases, only some of the pixels from the first image are mapped to, or fused with, a pixel from the second image. For example, the image size of the images may be different such that a pixel from a first image cannot be mapped to a second image (e.g., the first image is larger than the second image) or pixels in the second image are not mapped to the first image (e.g., the second image is larger than the first image).

As another non-limiting example, each pixel from a lower resolution image can be mapped to a pixel in the higher resolution image, whereas not all pixels from the higher resolution image may be mapped to a pixel in the lower resolution image. In some such cases, a pixel from the higher resolution image can be mapped to a pixel in the lower resolution image if a corresponding pixel on the lower resolution exists. For example, lidar images may have a higher or lower resolution than camera images. In some such cases, only some of the pixels in the camera image can be mapped to or fused with a pixel in the lidar image.

In cases where one of the images to be fused is a semantic image, the semantic data from a semantic image can be mapped to, or fused with, a second image. For example, a fused pixel can include image data and/or semantic data associated with the semantic image and image data associated with the second image. Accordingly, one pixel may be associated with (e.g., include) camera image data (e.g., position (x, y) red, green, blue, etc.), lidar image data (e.g., position (x, y, z), reflectance, intensity, timestamp, etc.), and/or semantic data (e.g., class label, semantic segmentation score or a computed feature vector, etc., or other feature embedding, etc.). In some cases, the fused pixel may include one type of image data with semantic data. For example, a fused image may include lidar image data and semantic data, but not camera image data, or vice versa. In certain cases, the fused pixel may include multiple types of image data with semantic data, such as lidar, radar and/or camera image data with semantic data.

Accordingly, the fusion system 504 can output a fused image that includes semantic data associated with the fused image and image data associated with at least one of the types of images. In some embodiments, the fused image can be similar to other images consumed by a 3D object detector, except that the fused image can include at least one or more additional dimensions (e.g., the semantic data).

In some cases, the fusion system 504 can fuse three or more images to generate the fused image. For example, the fusion system 504 can receive image data associated with a lidar image, semantic data associated with a semantic image generated from a camera image, and map data associated with a map image (or a map). Other image types, such as radar, can be used. In some such cases, the map data can indicate locations within a geographical area that include crosswalks, car or bicycle lanes, pedestrian walkways, etc. The fusion system 504 can fuse the map data with the image data and the semantic data to enable the fused image network 506 to generate additional features. In some cases, the fusion system 504 can use fuse the map data with the image data and the semantic data by projecting the image data to a bird's-eye view image and then embedding some or all of the pixels of the bird's-eye view image with map data and the semantic data. In some such cases, pixels in the fused image can include image data associated with the lidar/bird's-eye view image, semantic data associated with the semantic image, and map data associated with the map data (e.g., cross walk locations, lanes, etc.).

In some cases, the fusion system 504 uses location information to fuse the map data with the image data. For example, based on the location information, the fusion system 504 can determine a location and/or orientation of the image data relative to the map data. Based on the determined location, the fusion system 504 can determine which pixels of the image are to be annotated or embedded with corresponding map data.

In certain cases, such as where the field of view of two cameras overlap and a semantic image is generated from each of the two camera images, there may be some pixels in the fused image for which different semantic data can be used (e.g., a pixel from the first camera image and a pixel from the second camera image maps to the same lidar pixel).

In some such cases, the semantic data generated from the two camera image pixels can be randomly chosen for fusion with the image of a different type. In certain cases, the fusion system 504 can assign a higher confidence value to one of the two camera images and use the semantic data generated from that camera image for fusion with the image of a different type.

In some cases, there may be a greater lag between the time taken to generate a semantic image from an image 501A and provide the semantic image to the fusion system 504 and the time taken to provide the image 501b to the fusion system 504. Accordingly, in some cases, the fusion system 504 can fuse images 501a, 501b that are offset from each other in the time domain. For example, the fusion system 504 can fuse an image 501b, corresponding to time 2, with a semantic image generated from an image 501a that corresponds to time 1. In certain cases, the images 501a, 501b can be offset from each other by one or more microseconds or milliseconds, etc.

Fused Image Network

The fused image network 506 can be implemented using one or more CNNs that are the same as, or similar to, CNN 420 and/or CNN 440 and can be configured to receive fused image data associated with a fused image as input and output feature data associated with one or more features extracted from the fused image and/or output an annotated fused image that includes the image data associated with at least one type of image (e.g., the image data of at least one of the images used to create the fused image), semantic data associated with the fused image (e.g., the semantic data generated by the image feature extraction network 502), and feature data associated with the one or more features extracted from the fused image.

In some cases, the fused image network 506 can be implemented using a lidar neural network and/or a prediction network. In some cases, the lidar neural network is configured to determine width, height, and length of an object in an image, bounding boxes for an object, object movement, and/or object orientation. In certain cases, the prediction network is configured to determine features similar to the lidar neural network as well as an object trajectory prediction. In certain cases, the fused image network 506 can be implemented using the PointPillars, VoxelNet, or PointR-CNN networks.

As described herein, at least with reference to CNN 420, the fused image network 506 can include one or more filters, convolution layers, subsampling layers, and/or fully connected layers that can be used to detect the width, height, and length of an object in the fused image, generate bounding boxes for the object, determine object movement and object orientation, and/or predict the object trajectory using the fused image.

As described in U.S. application Ser. No. 17/096,916 and "PointPainting: Sequential Fusion for 3D Object Detection," arXiv:1911.10150v2 [cs.CV] 6 May 2020, each of which is incorporated by reference herein for all purposes, in some cases, the fused image network 506 can include a pillar encoder that outputs a pseudo image to a deep learning backbone network. The deep learning backbone can compute and output features to a detection head. The detection head can output oriented 3D bounding boxes, as described in "PointPillars: Fast Encoders for Object Detection from Point Clouds, arXiv:1812.05784v2 [cs.LG] 5 May 2019, the contents of which are incorporated herein by reference in their entirety for all purposes.

The feature data generated by the fused image network 506 can include, but is not limited to, any one or any combination of width, height, and length of an object in the fused image, bounding boxes for the object, object movement, object orientation, and/or object trajectory prediction. The generated features can be encoded into the fused image to form the annotated fused image.

In some cases, some or all pixels in the annotated fused image can include feature data associated with one or more features extracted from that pixel, a group of pixels, or the image. For example, a pixel in the annotated fused image can include one or more location values indicating a height, width, or length of an object, a bounding box value indicating an edge or a portion of a bounding box, an object movement value indicative of the object's movement, an object orientation value indicative of the object's orientation, and/or an object trajectory value indicative of the object's trajectory.

Some or all of the pixels in the annotated fused image can include additional data. For example, a pixel in the annotated fused image can include image data associated with at least one type of image (e.g., the image data of at least one of the images used to create the fused image), semantic data associated with the fused image (e.g., the semantic data generated by the image feature extraction network 502), and feature data associated with the one or more features associated with the fused pixel. For example, a pixel in the annotated fused image can include one or more annotations for location (x, y, z), reflectance, intensity, time stamp, different object class probabilities, bound boxes, trajectory prediction, movement, etc.

Loss Calculator

The loss calculator 508 can be implemented using one or more processors and can be configured to compare the annotated fused image with a verified image 510. As described herein, in some cases, the verified image 510 can include an image annotated by a user that corresponds to an image 501 provided to the image feature extraction network 502. In certain cases, the verified image 510 and the image 501 can correspond to the same image with the verified image 510 including one or more annotations made by a user.

The types of annotations in the verified image 510 can correspond to the types of annotations in the annotated fused image. For example, if the annotated fused image includes annotations or enrichments for object classes, bounding boxes, velocity, trajectory, etc., the verified image 510 can include annotations for object classes, bounding boxes, velocity, trajectory, etc.

To calculate the loss, the loss calculator can compare the annotations in the annotated fused image with the annotations in the verified image 510. In some cases, the loss calculator 508 calculates a loss for some or all pixels in the annotated fused image. For example, the loss calculator 508 can compare the annotations of some or all pixels in the annotated fused image with a corresponding pixel in the verified image 510.

The loss calculator 508 can calculate various types of losses, including, but not limited to, classification loss corresponding to the accuracy of an object's classification, localization loss corresponding to the accuracy of an object's size, location, and/or orientation, attribute loss corresponding to one or more attributes or features of an object (e.g., object trajectory, object movement), etc. Moreover, the loss calculator 508 can use a variety of techniques to calculate the loss. For example, the loss calculator can use mean-squared error (MSE), mean absolute error, cross-entropy or logarithmic loss, hinge loss, divergence loss, etc., to calculate the loss between the annotated fused image and a verified image 510.

The loss calculator can use different image types to calculate the loss depending on the type of image output by the fused image network 506. For example, if the annotated fused image is a lidar image, such as a 3D point cloud, the verified image 510 can be an annotated lidar image. As another non-limiting example, if the annotated fused image is a camera image, the verified image 510 can be an annotated camera image, etc. In certain cases, the output of the fused image network 506 can be transformed from one image type to another for comparison purposes. For example, if the fused image network 506 outputs a (3D) lidar image, the image can be transformed to a (2D) camera image for comparison with a verified image that is a (2D) camera image.

In certain cases, loss calculator 508 can be image type agnostic (e.g., the type of the image does may not matter for comparison purpose). In some such embodiments, the loss calculator 508 can compare the annotations of the annotated fused image with the annotations of the verified image 510. As the annotations may be the same regardless of whether the annotated fused image is a lidar image, camera image, or radar image, etc., the loss calculator 508 can calculate the loss even if the image types between the annotated fused image and the verified image 510 are distinct. Accordingly, in some embodiments, the verified images 510 may not include an underlying image. For example, the verified images 510 may include annotations, but may not include other image data (e.g., red, green, blue, etc.)

The loss calculated by the loss calculator 508 can be communicated to the image feature extraction network 502 to adjust the network parameters of the image feature extraction network 502, such as the weights assigned to different outputs of different nodes within the image feature extraction network 502. Although not illustrated, it will be understood that losses can similarly be communicated to the fused image network 506 to adjust its network parameters or weights.

In some cases, the loss calculator 508 communicates a portion or all losses to the image feature extraction network 502 and/or the fused image network 506. In certain cases, the losses are propagated through the image feature extraction network 502 and/or the fused image network 506 layer by layer and respective weights of the individual layers are updated. In certain cases, the weights may be updated in reverse order, with the last layer of the fused image network being updated first and the first layer of the image feature extraction network 502 being updated last. However, it will be understood that the weights of the image feature extraction network 502 and/or the fused image network 506 can be updated in any order.

In certain cases, gradients computed from the loss are sent back to the image feature extraction network 502 and/or the fused image network 506. Based on those gradients, the parameters of the feature extraction network 502 and/or the fused image network 506 are updated and the respective network produces a better embedding in the next iteration.

In some cases, if the losses are applied at the end of the fused image network 506 then weights in the image feature extraction network 502 and the fused image network 506 are updated. In certain cases, if losses are applied on top of (or only to) image feature extraction network 502, only the weights of the image feature extraction network 502 are updated. However, it will be understood that the losses can be propagated and weights updated in either or both of the image feature extraction network 502 and/or the fused image network 506.

In some cases, the losses communicated to the image feature extraction network 502 can correspond to the features that the image feature extraction network 502 is configured to learn and the losses communicated to the fused image network 506 can correspond to the features that the fused image network 506 is configured to learn. For example, if the image feature extraction network 502 is configured to learn object classifications, object location, object orientation, object movement, the losses associated with those features can be communicated to the image feature extraction network 502. Similarly, if the fused image network 506 is configured to learn object trajectory prediction), the object trajectory prediction can be communicated to the fused image network 506. Accordingly, a portion of the losses calculated by the loss calculator 508 can be communicated to the image feature extraction network 502 and/or the fused image network 506. In some cases, the losses for the same feature can be communicated to the image feature extraction network 502 and the fused image network 506. In certain cases, all losses calculated by the loss calculator 508 can be communicated to the image feature extraction network 502 and/or the fused image network 506.

By calculating the loss using the output of the fused image network 506 and using that loss to train the image feature extraction network 502, the image feature extraction network 502 can be trained to extract additional annotations or enrichments from the images 501. For example, the image feature extraction network 502 can learn to detect width, height, and length of an object from an image 501 and generate bounding boxes for the object. As such, the image feature extraction network 502 can output semantic images or semantic data associated with the semantic image with more annotations. These additional annotations can improve the accuracy of the annotations made by the fused image network 506 and/or make it easier for the fused image network 506 to determine additional annotations.

In some cases, the richer semantic data associated with an image (e.g., semantic data with more annotations) can be used to determine additional features from a fused image. For example, the image feature extraction network 502 can learn to predict that brake lights of a vehicle means that the vehicle is about to slow down. This data, provided to the fused image network 502, can improve the fused image network's 506 ability to determine the future trajectory of the vehicle. As another non-limiting example, if the image feature extraction network 502 detects a red traffic light in an image, it can learn that the vehicles in the same lane will not move. When the image feature extraction network 502 detects that the light has turned green, it can predict that the vehicles will begin to move slowly. Again, providing this enriched data to the fused image network 506 can make it easier for the fused image network 506 to determine the trajectory of the vehicles, etc.

In some cases, the training of the perception system 402 can include repeatedly processing images 501 from the same or different datasets and providing the calculated losses for each image 501 and/or each pixel of each image to the image feature extraction network 502. In certain cases, the perception system 402 may process images 501 thousands, hundreds of thousands, millions or more times to tune the image feature extraction network 502 and/or the fused image network 506.

Example Operating Diagrams of Testing System

FIGS. 5B and 5C are operation diagrams illustrating an example end-to-end training operation of the perception system 402 using a fused image generated based on a camera image 501a a lidar image 501b.

At step 550, image data associated with the camera image 501a is provided to the image feature extraction network 502. In the illustrated example, a camera image 501a is used, however, it will be understood that different types of images can be used. As described herein, the camera image 501a can correspond to an image in a database that was generated from image data obtained from a camera, such as cameras 202a. In some cases, the camera image 501a can include multiple rows of pixels in a matrix, and each pixel can include a value for red, green, and blue or a grayscale value. In certain cases, the camera image 501a does not include annotations and/or may be referred to as an unannotated camera image 501a.

At step 552a, the image feature extraction network 502 generates semantic data associated with a semantic image 520 from the image data associated with the camera image 501a. As described herein, the image feature extraction network 502 can use one or more CNNs 420 to generate semantic data for some or all pixels in the semantic image 520 from corresponding pixels in the camera image 501a. In some cases, the semantic data associated with a particular pixel can include a class label or object classification score that includes a probability value indicating the probability that the identified object classification for a pixel is correctly predicted.

At step 552b, image data associated with a lidar image 501b is provided to the fusion system 504. In the illustrated example, a lidar image 501b is used, however, it will be understood that different types of images can be used. As described herein, the lidar image 501b can correspond to an image in a database that was generated from image data obtained from a lidar sensor, such as lidar sensors 202b. In some cases, the lidar image 501b can include multiple rows of pixels in a matrix, and each pixel can include one or more values for location (e.g., x, y, z), reflectance, intensity, timestamp, etc. In certain cases, the lidar image 501 can be a three-dimensional point cloud. In some cases, the lidar image 501b does not include annotations and/or may be referred to as an unannotated lidar image 501b. As described herein, in some cases, due to the lag in generating the semantic image 520 from the camera image 501a, the lidar image 501b may be offset from the camera image 501a in the time domain.

At step 554, the fusion system 504 generates fused image data associated with a fused image 522 from the image data associated with the lidar image 501b and the semantic data associated with the semantic image 520. As described herein, the fused image 522 can include rows of fused pixels in a matrix and fused image data can be associated with each fused pixel. In some cases, the fused image data associated with a particular pixel can include one or more values for image data associated with the lidar image 501b, semantic data associated with the semantic image 520, and/or image data associated with the camera image 501a. In the illustrated example of FIG. 5B, the fused image data associated with the pixels in the fused image 522 includes semantic data associated with the semantic image 520 embedded with one or more values for image data associated with the lidar image 501b.

With reference to FIG. 5C, at step 556a, the fused image network 506 generates feature data associated with an annotated fused image 524 from the fused image data associated with the fused image 522. The fused image network 506 may also be referred to as a 3D object detector can be implemented using one or more CNNs 420 to generate feature data for some or all pixels in the annotated fused image 524 from corresponding pixels in the fused image 522. In certain cases, the generated feature data associated with the annotated fused image 526 can be embedded into individual pixels. In some cases, the feature data associated with a particular pixel in the annotated fused image 524 can include width, height, and length of an object in an image, class label, bounding boxes for an object, object movement, object orientation, object trajectory prediction. In some certain cases, the feature data can include one or more n-dimensional feature vectors where each feature individually may not correspond to a particular object attribute, but a combination of n-dimensional feature vectors can correspond to one of the aforementioned object attributes (or other object attribute).

At step 556b, verified image data associated with a verified image 526 is provided to the loss calculator 508. In the illustrated example, a verified camera image 526 is shown, however, it will be understood that different types of images can be used as the verified image 526. In some cases, the verified image 526 may not have an image type. For example, the verified image 526 can include rows of pixels in a matrix, and some or all of the pixels can be associated with verified image data or annotations that represent target features (and values) that should be extracted from an image 501. As described herein, the verified image data associated with the verified image 526 can be generated by a user to indicate what the perception system 402 should perceive within an image 501. As such, verified image data associated with one or more pixels of the verified image 526 can include one or more values for width, height, and length of an object in an image, an object classification, bounding boxes for an object, object movement, object orientation, object trajectory, etc.

At step 558, the loss calculator 508 generates loss data associated with a loss 528 based on (e.g., by comparing) feature data associated with the annotated fused image 524 and verified image data associated with the verified image 526. Although illustrated as an image, it will be understood that the loss 528 may be communicated as one or more values, such as a matrix of values corresponding to pixels of an image.

As described herein, in some cases, the loss calculator 508 can calculate a loss for some or all pixels and for each feature represented in feature data associated with a particular pixel of the annotated fused image 524. Accordingly, if the annotated fused image 524 includes thirteen annotations for each pixel, or thirteen dimensions, the loss calculator 508 can calculate thirteen losses for some or all pixels in the annotated fused image 524.

At step 560, the image feature extraction network 502 and/or fused image network 506 modifies one or more network parameters using the loss data associated with the loss 528. The modified network parameters are used to generate semantic data associated with semantic images from image data associated with subsequent images.

As described herein, in some cases, some or all loss data associated with the loss 528 is communicated to the image feature extraction network 502 and/or fused image network 506. In certain cases, the loss 528 can be propagated layer-by-layer through the image feature extraction network 502 and/or fused image network 506 (in certain cases in reverse order). In some cases, different loss data associated with the loss 528 is communicated to the different networks 502, 506. In certain cases, the loss communicated to the different networks 502, 506 is based on the semantics or features expected to be extracted by the respective networks 502, 506.

As the network parameters are modified or tuned, the calculated loss between the annotated fused images 524 and the verified images 526 can be reduced indicating that the image feature extraction network 502 and/or the fused image network 506 are improving their ability to accurately determine semantics and features from images.

As described herein, the end-to-end training process can be repeated thousands, hundreds of thousands, millions, or more times in order to tune the image feature extraction network 502 and/or the fused image network 506. By tuning the image feature extraction network 502 in an end-to-end fashion (e.g., with loss data associated with the loss 528 calculated using the feature data associated with the annotated fused image 524 output from the fused image network 506), the image feature extraction network 502 can learn additional features and/or semantics from the image data associated with an image 501. These additional features can enable the fused image network 506 to learn other features and contextual information.

Once trained, the perception system 402 can be used during inference to receive real-time images from the cameras 202a, lidar sensors 202b, and/or radar sensors 202c, identify objects within the images, and determine features about the objects, such as, but not limited to, width, height, and length of an object, class label, bounding boxes for an object, object movement, object orientation, object trajectory, or other object attributes (e.g., traffic light status (e.g., red, green, yellow, blinking, etc.) or car with right/left turn signal blinking or hazard lights blinking, etc.), etc. For example, the image feature extraction network 502 can generate semantic data associated with a semantic image that includes width, height, and length of one or more objects in image, object classifications, bounding boxes for the object, object movements, object orientations, etc., and the fused image network 506 can generate feature data associated with an annotated fuse image that includes, but is not limited to the semantic data associated with the semantic image as well as additional features, such as, but not limited to, object trajectory, etc. It will be understood that the features generated by the image feature extraction network 502 and/or fused image network 506 can be the same, different, or overlap.

In addition, during inference, some of the functions or elements described herein may not be used or may not be present. For example, during inference loss may not be calculated and/or the network parameters of the image feature extraction network 502 and/or fused image network 506 may not be tuned, etc.

Example Flow Diagram of Testing System

Figure 6:
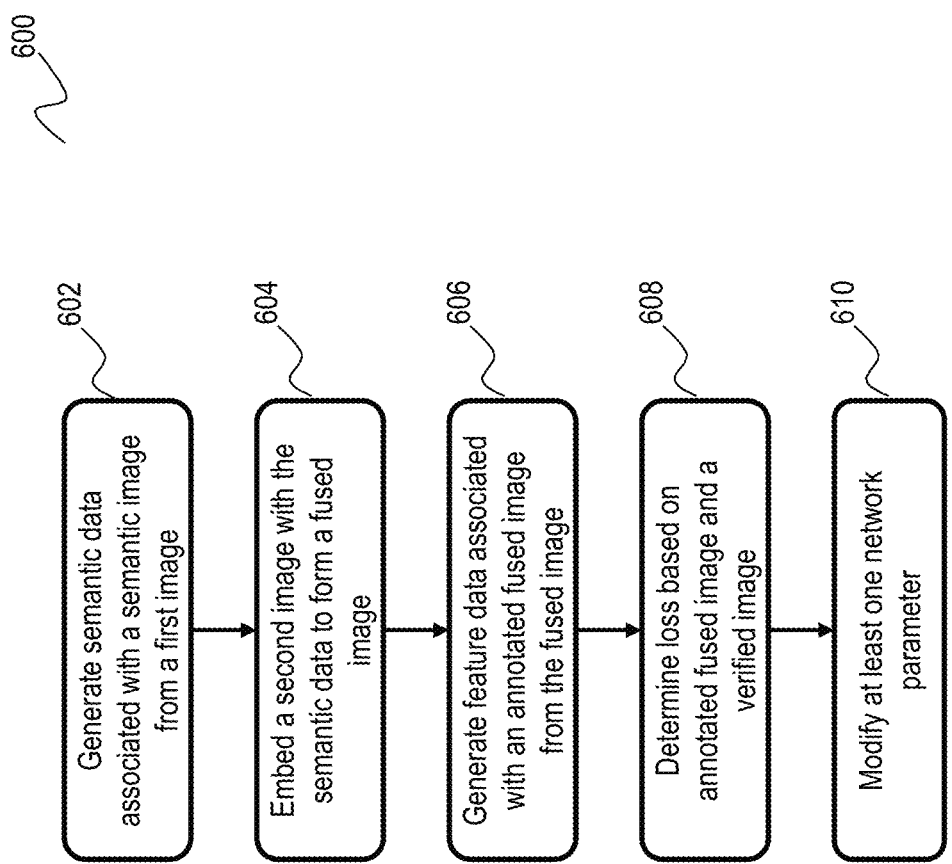
FIG. 6 is a flow diagram illustrating an example of a routine implemented by one or more processors to train the perception system.

FIG. 6 is a flow diagram illustrating an example of a routine 600 implemented by one or more processors to train a perception system 402. The flow diagram illustrated in FIG. 6 is provided for illustrative purposes only. It will be understood that one or more of the steps of the routine illustrated in FIG. 6 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components may be used.

At block 602, the training system 500 generates semantic image data associated with a semantic image from first image data associated with a first image. As described herein, in some cases, the first image can be a camera image that includes rows of colored or grayscale pixels, and the training system 500 can use an image feature extraction network 502 to generate the semantic data associated with the semantic image. However, it will be understood that other, different types of images, such as lidar images and/or radar images can be used.

As described herein, the training system 500 can determine semantic data associated with some or all of the pixels in the first image. In certain cases, the semantic data associated with a pixel includes a class label or object classification that associates the pixel with an object.

At block 604, the training system 500 embeds a second image with the semantic data associated with the semantic image to form a fused image. As described herein, the second image can be a different type of image. For example, if the first image is a camera image, the second image can be a lidar image, such as a 3D point cloud.

Similar to the first image, the second image can include rows of pixels. As the second image is a different type of image, the image data associated with a particular pixel can be different. For example, if the second image is a 3D point cloud, the image data associated with a particular pixel can include a position (x, y, z), reflectance, intensity, timestamp, etc.

As described herein, the fused image can include rows of pixels embedded with semantic data associated with the semantic image and image data associated with the second image (and/or first image). For example, if the second image is a 3D point cloud, a pixel in the fused image can include or be embedded with one or more object classifications, as well as location (x, y, z), reflectance, intensity, and timestamp. In some such cases, the fused image can be referred to as a decorated 3D point cloud.

At block 606, the training system 500 generates feature data associated with an annotated fused image from the fused image. As described herein, in some cases, the training system 500 uses a fused image network 506 to generate the annotated fused image and the feature data associated with the annotated fused image. As described herein, the fused image network 506 can generate various features for the annotated fused image, including, but not limited, width, height, and length of an object in an image, object classification or class label, bounding boxes for an object, object movement, object orientation, object trajectory prediction.

As described herein, the annotated fused image can include rows of pixels and feature data associated with some or all of the pixels of the annotated fused image.

At block 608, the training system 500 determines a loss based on a comparison of the annotated fused image with a verified image. As described herein, in some case, the training system 500 can determine losses for different features. In certain cases, the training system can determine a loss for some, or all features associated with (or embedded into) the annotated fused image.

As described herein, the verified image can include rows of pixels and features embedded within each pixel that indicate a target value for a respective feature. The target value can be compared with the value determined for that feature by the image feature extraction network 502 and/or fused image network 506 to calculate the loss for that feature. The training system 500 can use a variety of techniques to calculate loss including, but not limited to, mean-squared error (MSE), mean absolute error, cross-entropy or logarithmic loss, hinge loss, divergence loss, etc.

At block 610, the training system modifies one or more network parameters of the image feature extraction network 502 based on the determined loss. As described herein, the image feature extraction network 502 can include various parameters or weights used to determine the semantic data. As one or more of the parameters are modified the loss can be reduced. Accordingly, the training system 500 can modify at least one network parameter of the image feature extraction network 502 to reduce the loss for at least one feature.

Similarly, the training system 500 can modify one or more network parameters of the fused image network 506 based on the determined loss. In some cases, the training system 500 modifies one or more network parameters of the fused image network 506 to reduce the loss for one set of features and modifies one or more network parameters of the image feature extraction network 502 to reduce the loss for a different set of features.

In some cases, the training system modifies weights of individual layers of the fused image network 506 and/or image feature extraction network 502. In certain cases, the training system modifies weights or network parameters of the individual layers of the fused image network 506 and/or image feature extraction network 502 in reverse order such that the weights or network parameters of the last layer of the fused image network 506 is updated first and the weights or network parameters first layer of the feature extraction network 502 are updated last.

It will be understood that the routine 600 can be repeated multiple times using different images and/or different types of images. In some cases, the training system 500 repeats the routine 600 thousands or millions of times using thousands or millions of images to reduce the loss between the verified images and the annotated fused images.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously recited step or entity.

What is claimed is:

1. A method, comprising:
    generating, using an image feature extraction network and at least one processor, semantic data associated with a first semantic image from a first image of a first image type, wherein the image feature extraction network comprises a first neural network configured to extract first features corresponding to a plurality of objects in the first image;
    embedding, using the at least one processor, second image data of a second image of a second image type with the semantic data associated with the first semantic image to form a fused image, wherein for at least one object, the fused image includes at least a portion of the second image data of the second image embedded with a first feature corresponding to at least a portion of the semantic data extracted from the first image;
    generating, using a fused image network, an annotated fused image from the fused image, wherein the annotated fused image comprises feature data extracted from the fused image, wherein the fused image network comprises a second neural network configured to extract second features corresponding to the plurality of objects in the first image, wherein the second features are different from the first features;
    determining, using one or more processors, a loss corresponding to an object of the plurality of objects of the annotated fused image based on a comparison of the annotated fused image with a verified image; and
    modifying at least one network parameter of the image feature extraction network based on the loss, wherein the image feature extraction network uses at least one modified network parameter to generate semantic data associated with a second semantic image.

2. The method of claim 1, wherein the second image is a 3D point cloud, the method further comprising:
    receiving map data associated with a map;
    determining a location of the 3D point cloud within the map; and
    embedding 3D point cloud data with annotations associated with the map based on the location of the 3D point cloud within the map to form the fused image.

3. The method of claim 1, wherein the first image is a camera image.

4. The method of claim 1, wherein the second image is a 3D lidar point cloud.

5. The method of claim 1, wherein the fused image network is a lidar neural network.

6. The method of claim 1, wherein the fused image network is a prediction neural network.

7. The method of claim 1, wherein the second image is a 3D point cloud, wherein embedding the second image data with the semantic data comprises:
    transforming the 3D point cloud into a bird's-eye view image; and
    embedding bird's-eye view image data with the semantic data associated with the first semantic image to form the fused image.

8. The method of claim 1, wherein the semantic data associated with a pixel of the first semantic image includes at least one feature embedding.

9. The method of claim 1, wherein the feature data associated with the annotated fused image comprises at least one of width, height, and length of an object, bounding box for the object, object movement, object orientation, or object trajectory prediction.

10. The method of claim 1, wherein the semantic data associated with a pixel of the first semantic image includes an object classification score.

11. The method of claim 10, wherein the object classification score associates the pixel with a particular object classification from a plurality of object classifications.

12. The method of claim 11, wherein the plurality of object classifications comprise at least one of a car class, a bicycle class, a pedestrian class, a barrier class, a traffic cone class, a drivable surface class, or a background class.

13. The method of claim 1, wherein the verified image includes a target feature value for each feature included in the feature data associated with the annotated fused image.

14. The method of claim 1, wherein determining the loss based on the comparison of the annotated fused image with the verified image comprises comparing at least one feature included in feature data associated with a particular pixel with a target feature value in a corresponding pixel of the verified image.

15. A system, comprising:
    an image feature extraction network configured to generate semantic data associated with a first semantic image from a first image of a first image type, wherein the image feature extraction network comprises a first neural network configured to extract first features corresponding to a plurality of objects in the first image;
    a fusion system configured to embed second image data of a second image of a second image type with the semantic data associated with the first semantic image to form a fused image, wherein for at least one object, the fused image includes at least a portion of the second image data of the second image embedded with a first feature corresponding to at least a portion of the semantic data extracted from the first image;
    a fused image network configured to generate feature data associated with an annotated fused image from the fused image, wherein the annotated fused image comprises feature data extracted from the fused image, wherein the fused image network comprises a second neural network configured to extract second features corresponding to the plurality of objects in the first image, wherein the second features are different from the first features; and
    a loss calculator configured to generate a loss corresponding to an object of the plurality of objects of the annotated fused image based on a comparison of the annotated fused image with a verified image, wherein the image feature extraction network is further configured to modify at least one network parameter based on the loss and uses at least one modified network parameter to generate semantic data associated with a second semantic image.

16. The system of claim 15, wherein the second image is a 3D lidar point cloud.

17. The system of claim 15, wherein the fused image network is a lidar neural network.

18. The system of claim 15, wherein the second image is a 3D point cloud, wherein to embed the second image data with the semantic data, the fusion system is further configured to:
   transform the 3D point cloud into a bird's-eye view image; and
   embed bird's-eye view image data with the semantic data associated with the first semantic image to form the fused image.

19. The system of claim 15, wherein the second image is a 3D point cloud, wherein to embed the second image data with the semantic data, the fusion system is further configured to:
   receive map data associated with a map;
   determine a location of the 3D point cloud within the map; and
   embed 3D point cloud data with annotations associated with the map based on the location of the 3D point cloud within the map to form the fused image.

20. At least one non-transitory storage media storing instructions that, when executed by at least one processor, cause the at least one processor to:
   generate, using an image feature extraction network, semantic data associated with a first semantic image from a first image of a first image type, wherein the image feature extraction network comprises a first neural network configured to extract first features corresponding to a plurality of objects in the first image;

embed second image data of a second image of a second image type with the semantic data associated with the first semantic image to form a fused image, wherein for at least one object, the fused image includes at least a portion of the second image data of the second image embedded with a first feature corresponding to at least a portion of the semantic data extracted from the first image;

generate, using a fused image network, feature data associated with an annotated fused image from the fused image, wherein the annotated fused image comprises feature data extracted from the fused image, wherein the fused image network comprises a second neural network configured to extract second features corresponding to the plurality of objects in the first image, wherein the second features are different from the first features;

determine a loss corresponding to an object of the plurality of objects of the annotated fused image based on a comparison of the annotated fused image with a verified image; and modify at least one network parameter of the image feature extraction network based on the loss, wherein the image feature extraction network uses at least one modified network parameter to generate semantic data associated with a second semantic image.

* * * * *